US006330849B1

(12) United States Patent
Chao

(10) Patent No.: US 6,330,849 B1
(45) Date of Patent: Dec. 18, 2001

(54) STAND FOR AN ELECTRIC POT

(76) Inventor: Ming-Hui Chao, No. 158, Chiuying Li, Chiuying, Yonshui Chen, Tainan Hsien (TW)

( * ) Notice: Subject to any disclaimer, the term of this patent is extended or adjusted under 35 U.S.C. 154(b) by 0 days.

(21) Appl. No.: 09/662,680

(22) Filed: Sep. 15, 2000

(30) Foreign Application Priority Data

Sep. 16, 1999 (TW) .................................................. 88215905

(51) Int. Cl.[7] .............................. A47J 31/00; F27D 11/00
(52) U.S. Cl. .................................. 99/288; 99/279; 99/290; 99/323.3; 219/430; 219/432; 219/433; 219/478; 219/480
(58) Field of Search .............................. 99/288, 279, 304, 99/306, 307, 290, 323.3; 219/429, 432, 433, 436, 430, 476, 478, 477, 480

(56) References Cited

U.S. PATENT DOCUMENTS

| 4,128,050 | * | 12/1978 | Petry | ...................................... | 99/304 |
| 4,192,227 | * | 3/1980 | Petry | ...................................... | 99/279 |
| 4,825,757 | * | 5/1989 | Stoner | ...................................... | 99/279 |

* cited by examiner

Primary Examiner—Reginald L. Alexander
(74) Attorney, Agent, or Firm—Kolisch Hartwell Dickinson McCormack & Heuser

(57) ABSTRACT

A stand for an electric pot has a support extending out from a peripheral edge of a base of the stand and a plate integrally formed with the support and being adapted to receive and support cups on the plate. When the water within the electric pot is boiled, the cups that go with the pot can simultaneously be heated for sanitary purposes.

2 Claims, 6 Drawing Sheets

STAND FOR AN ELECTRIC POT

BACKGROUND OF THE INVENTION

1. Field of the Invention

The present invention relates to a stand for an electric pot, and more particularly to a stand not only is able to provide the required electricity to boil the water in the pot, but also is able to provide the required heat to bake the cups that go with the pot so as to maintain the cups clean.

2. Description of Related Art

Electric pots are used in daily life and are much safer than the conventional pots that are put on a stove. A conventional stand for an electric pot is shown in FIG. 6, which has a base (80) configured to receive a pot (90) thereon. The base (80) has contact switch provided to correspond to the coil in the pot (90). Accordingly, when the pot (90) is situated on top of the base (80) and the contact switch is activated, the contact switch will close the circuit and provide the electricity for the coil in the pot (90). Thereafter the water in the pot will be gradually boiled. However for those teagoers, the cups used to make tea require a further process to clean, which is quite troublesome and a waste of time.

In order to overcome the problems in maintaining the cups that go with the electric pot, an improved stand for the electric pot is introduced to mitigate and obviate the aforementioned difficulties.

SUMMARY OF THE INVENTION

The primary objective of the invention is to provide an improved stand for an electric pot, which has a support extending outward from the base to receive cups on a plate integrally formed with the support and extending laterally from a distal end of the support. With the stand, the user not only can boil the water in the pot, but also can bake the cups that go with the pot to make tea simultaneously.

Other objects, advantages and novel features of the invention will become more apparent from the following detailed description when taken in conjunction with the accompanying drawings.

DETAILED DESCRIPTION OF THE PREFERRED EMBODIMENT

Figure 1:
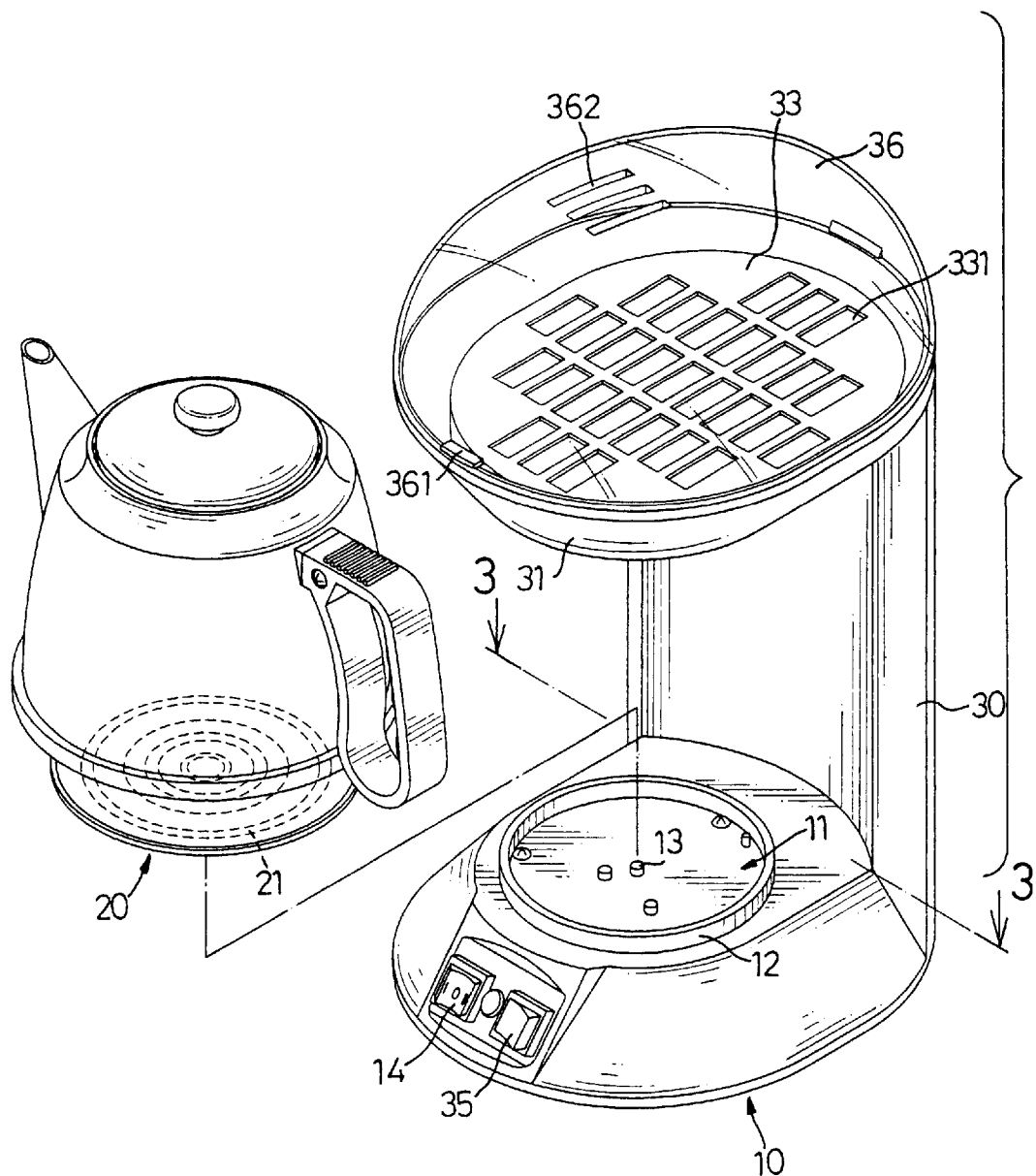
FIG. 1 is an exploded perspective view of the stand for an electric pot, which is constructed in accordance with the present invention.
Figure 2:
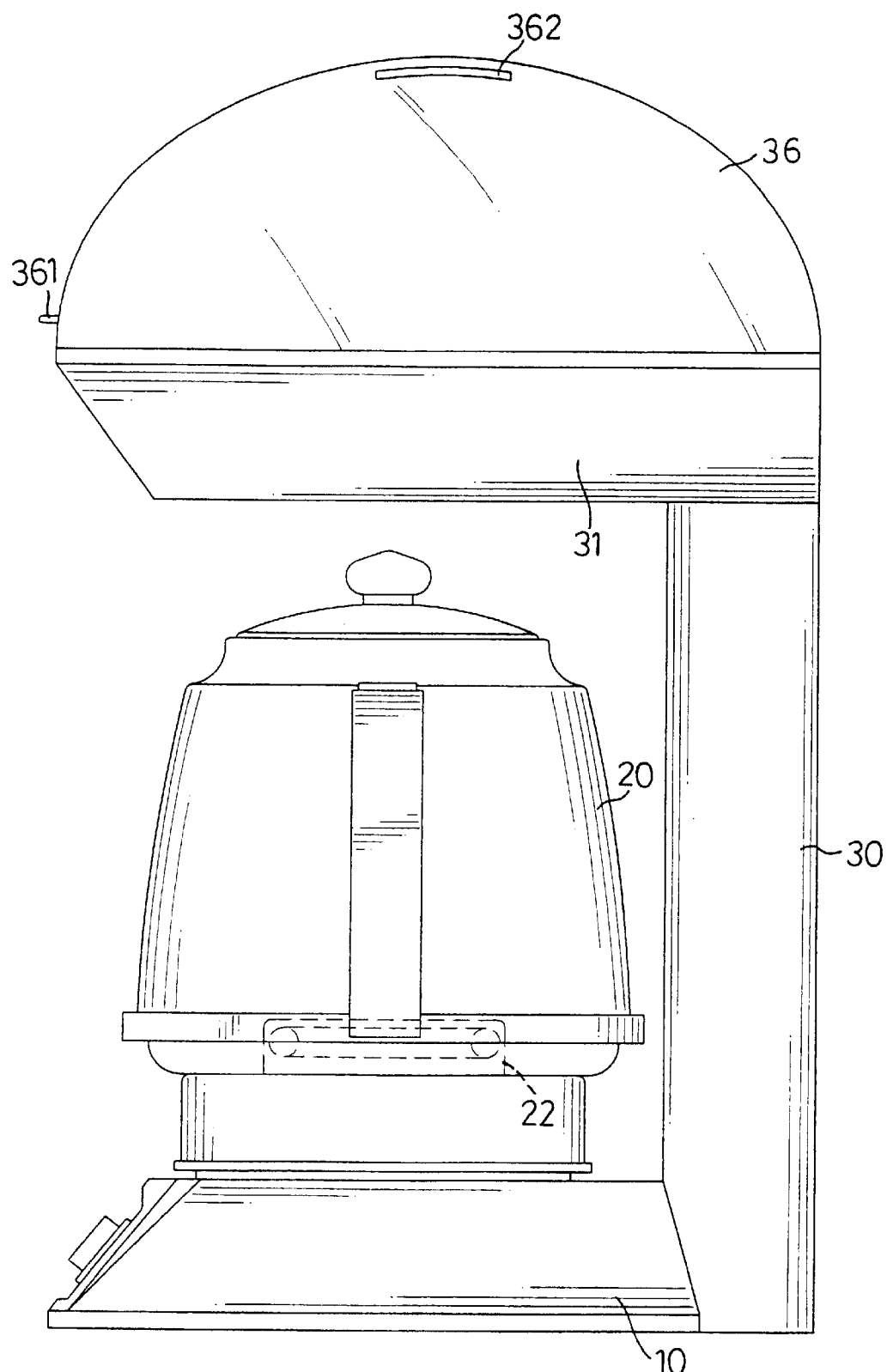
FIG. 2 is a side plan view of the stand in combination with the electric pot situated on top of the base of the stand.

With reference to FIGS. 1 and 2, a stand for an electric pot, which is constructed in accordance with the present invention comprises a base (10) and a support (30).

The base (10) has a heating device (11) provided inside the base (10) and being composed of multiple contacts (13) on the top face of the base (10) and a switch (14) electrically connected to the contacts (13). A flange (12) is formed on the top face of the base (10) so as to limit the movement of the electric pot (20) when situated on top of the base (10). The electric pot (20) has multiple coils (21) inside the pot (20) and electrically engageable with the contacts (13), such that when the electric pot (20) is placed on top of the base (10), by the control of the switch (14), the contacts (13) will provide the required electricity to the coil (21) to heat up the water in the electric pot (20).

Figure 3:
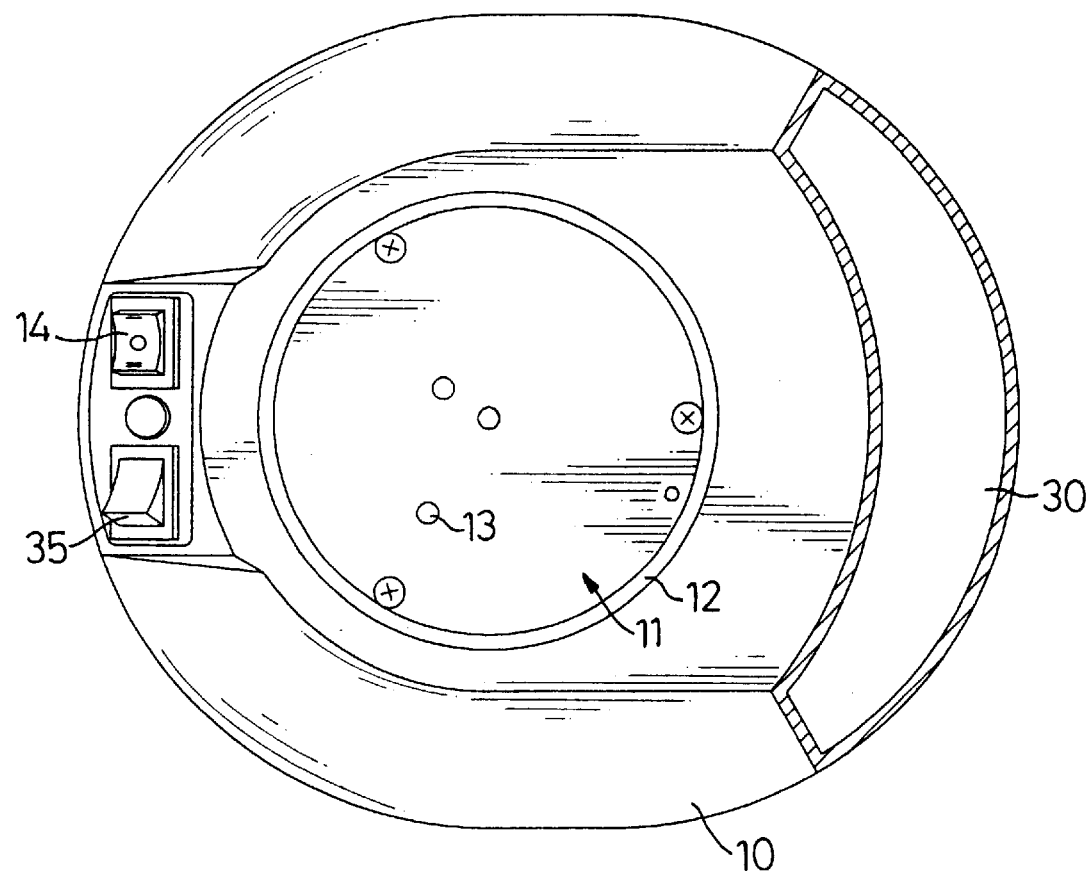
FIG. 3 is a top plan view of the stand with the arm in cross section along the line 3—3 of FIG. 1.
Figure 4:
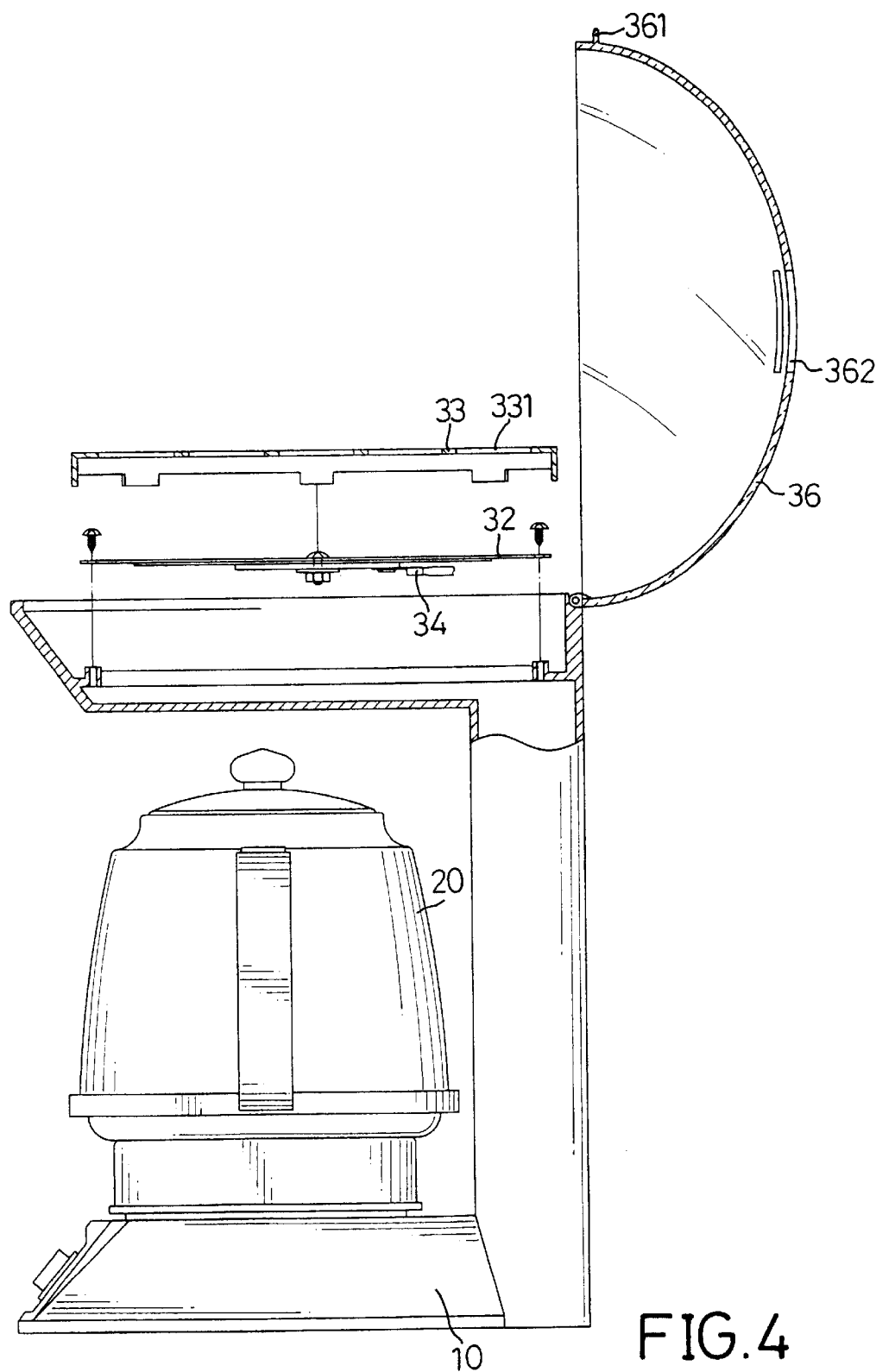
FIG. 4 is s schematic view showing the cover of the stand is opened.

With reference to FIGS.3 and 4 and still taking FIG. 1 for reference, the stand of the invention further has a support (30) integrally extending out from a peripheral edge of the base (10) and having a plate (31) laterally extending out from a distal end of the support (30). The plate (31) has a heat dissipater (32), a grill (33) and a heating element (34).

The heat dissipater (32) is embedded inside the plate (31) and the heat element (34) is provided beneath the heat dissipater (32), such that when the cups are placed on top of the grill (33) and the heating element (34) is actuated by the secondary switch (35) beside the switch (14), the heat is able to pass through the openings (331) of the grill (33) to proceed the sanitary process to the cups.

Furthermore, a cover (36) made of transparent, heat-resistant is pivotally connected to the base (31) and has a protrusion (361) extending out from a peripheral side of tie cover (36) to facilitate the holding to the cover (36) by the user and a through hole (362) defined in a top face of the cover (36) to dissipate excessive heat within the cover (36).

Figure 5:
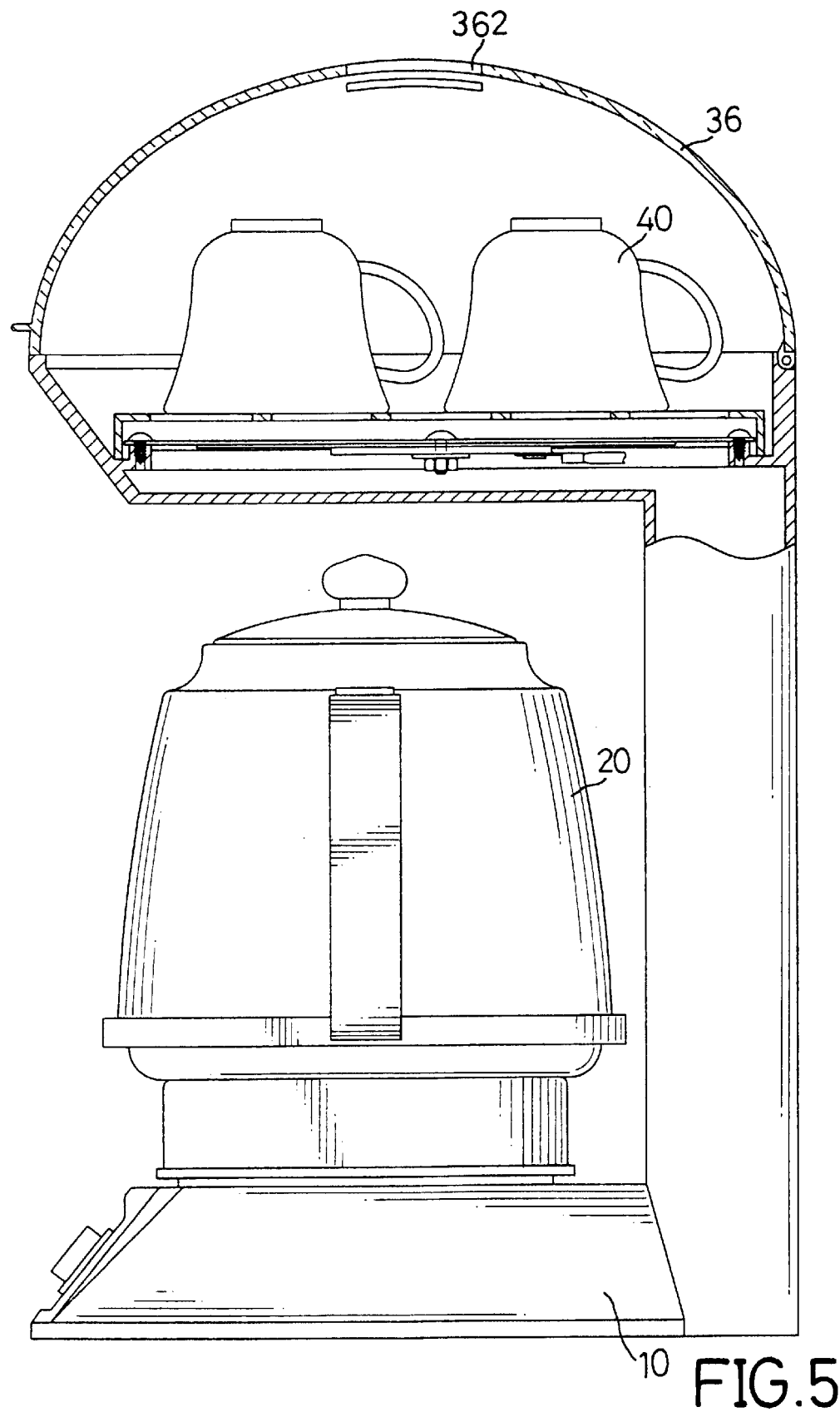
FIG. 5 is a side plan view in partial cross section, wherein cups are received in the cover for cleanliness.
Figure 6:
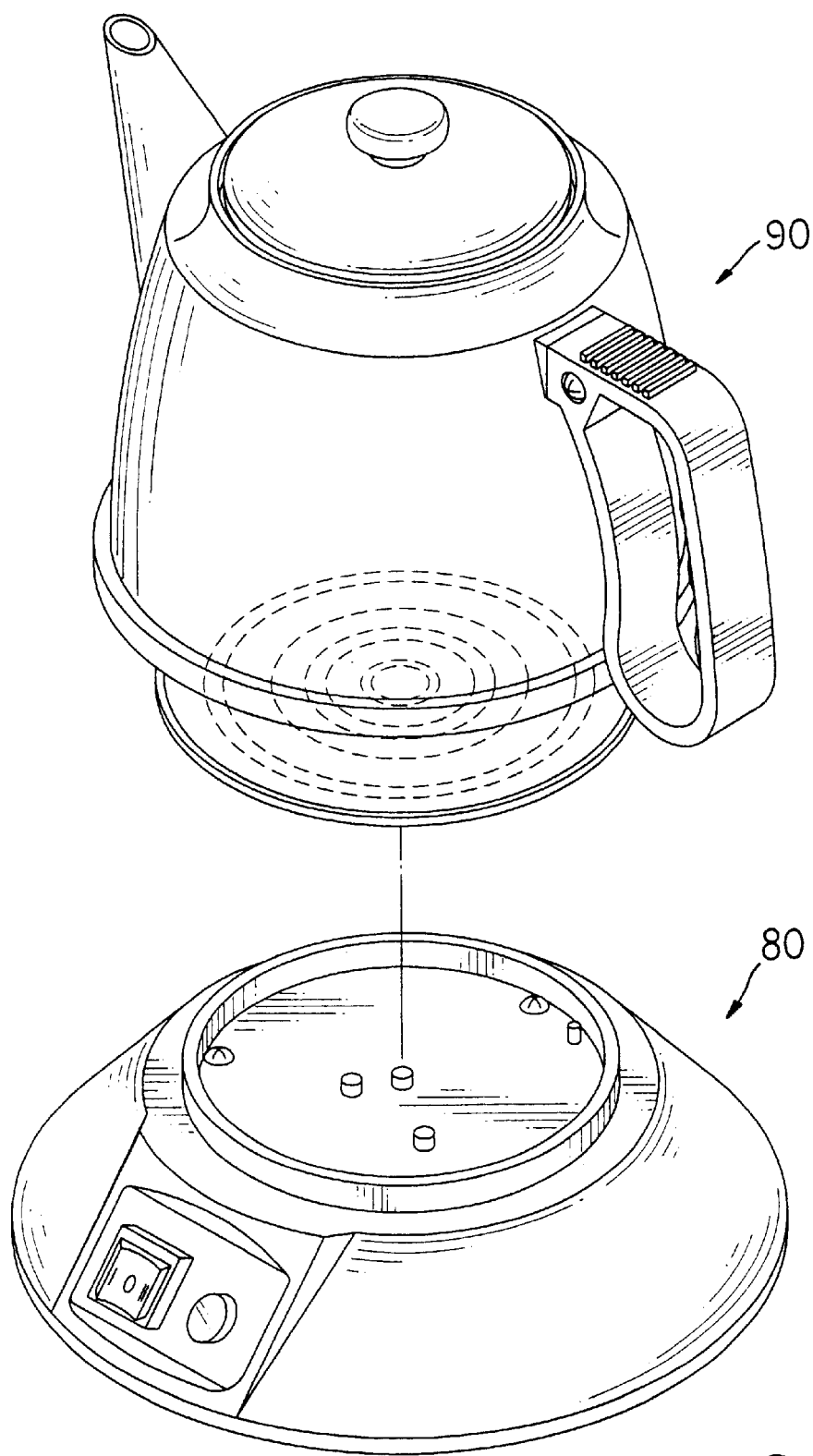
FIG. 6 is an exploded perspective view of a conventional stand for an electric pot.

With reference to FIG. 5, it is noted that when the cups (40) are placed on top of the grill (33), the user presses the secondary switch (35) to enable the heating element (34) to provide the required heat to undergo the sanitary process to the cups (40). In the preferred embodiment, the heating element (34) may be an infrared heater.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stand for an electric pot comprising:

base configured to receive the electric pot thereon and having on a top face of the base a heating device composed of contacts and a switch electrically connected to the contacts and a flange formed around the contacts so as to limit the movement of the electric pot when the electric pot is placed on the top face of the base; and a support extending out from a peripheral edge of the base and having a plate integrally formed on and laterally extending out from a distal end of the support, the plate having a heat dissipater embedded inside the base, a grill placed on top of the heat dissipater, a heating element located beneath the heat dissipater and electrically connected with a secondary switch on the base and beside the switch and a cover pivotally connected with the base and having a protrusion formed outside the cover for easy holding and through holes defined to communicate with ambient air to dissipate the heat within the cover.

2. The stand as claimed in claim 1, wherein the heating element in the plate is an infrared heater.

* * * * *